Patented Nov. 9, 1948

2,453,585

UNITED STATES PATENT OFFICE 2,453,585

PROCESS OF MAKING A SUBSTANTIALLY ALKALI-FREE HYDROGEL CATALYST

John W. Payne, Thomas P. Simpson, and James I. Butzner, Woodbury, N. J., assignors to Socony-Vacuum Oil Company, Incorporated, a corporation of New York No Drawing. Application August 24, 1945, Serial No. 612,560

5 Claims. (Cl. 252—254)

This invention relates to the manufacture of a hydrocarbon conversion catalyst and more particularly to the catalytic cracking of hydrocarbons in the presence of a low alkali metal content catalyst.

Inorganic oxide gels, such as silica-alumina gel, have long been used as catalysts in hydrocarbon conversion operations. The presence of an alkali metal contained in the gel, usually sodium, has been recognized as being detrimental to the conversion process and attempts have accordingly been made to reduce its content to a minimum. Thus, a silica-alumina hydrogel produced by the reaction of sodium silicate and a sulfuric acid-aluminum sulfate solution contains sodium compounds which are formed as a product of the reaction. The sodium is present in the freshly formed hydrogel both as sodium sulfate and as zeolitic sodium attached to the silica-alumina hydrogel structure. Soluble sodium salts, such as sodium sulfate, can be removed by water washing the hydrogel. The zeolitic sodium, however, must be removed by a base exchange operation. Thus, when a freshly formed silica-alumina hydrogen is treated with hot water, base exchanged with a dilute solution of aluminum sulfate, water washed to remove soluble sodium compounds and dried, the residual sodium content of the finished gel can be reduced to a minimum of about 0.2 per cent by weight. The use of greater quantities of exchange salt has little effect on further sodium removal.

As a result of the present invention the sodium content of inorganic oxide gel catalysts can be reduced to .05 per cent by weight or less. In addition to eliminating the heretofore recognized detrimental effects, of employing a hydrocarbon conversion catalyst containing an alkali metal, the desirability of employing a very low alkali metal content catalyst in commercial hydrocarbon conversion operations is derived from its effect on the rate of deactivation. It has been found in accordance with the present invention that by using a low sodium content catalyst, the rate of deactivation of the catalyst during service can be considerably decreased. This will be more readily understood when it is considered that the catalyst is contacted with hydrocarbon vapors at conversion conditions, for example, 800° F.–1000° F. at atmospheric or greater pressures. The reaction which takes place is essentially a cracking to produce lighter hydrocarbons, but is accompanied by a number of complex side reactions such as aromatization, polymerization, alkylation and the like. As a result of these complex reactions, a carbonaceous deposit is laid down on the catalyst which is commonly called coke. The coke tends to seriously impair the catalytic efficiency of the catalyst for the principal reaction and the conversion reaction is therefore suspended after coke, to the extent of a few percent by weight, has accumulated on the catalyst. The catalytic surface is then regenerated by burning the coke in a stream of oxidizing gas and the catalyst is returned to the conversion stage of the cycle.

The catalyst also undergoes a second type of degeneration by reason of changes in the catalyst itself as contrasted with the masking of catalytic surfaces by a coke deposit. As the catalyst is carried through a large number of cycles of alternate conversion and regeneration, the activity following each regeneration becomes progressively less until the activity is too low for economical use of the catalyst. These two ways of degeneration differ in the time factor as well as in the nature of the change occurring. Coke deposition, referred to as contamination, is fairly rapid, it being desirable to remove the coke by burning after about 10 to 90 minutes on stream. On the other hand, the change in basic nature of the catalyst, resulting in lowered activity after regeneration is a slow change. A catalyst may be in service for 15,000 thirty-minute cycles before becoming so degenerated as to require replacement. This process is referred to as deactivation.

It would, of course, be desirable to decrease the rate at which deactivation of the catalyst proceeds. This has now been accomplished in accordance with the present invention by lowering the sodium content of the catalyst to an extremely low value, which in turn reduces the rate of deactivation to a minimum.

To obtain the utmost efficiency from a hydrocarbon conversion catalyst it is necessary to adjust the catalyst density to a predetermined value which will depend in part upon the conditions under which the conversion operations are carried out. The adjustment of the catalyst density should be made preferably before removal of sodium or other alkali metal ions from the hydrogel is undertaken. It has been found that the rate at which coke can be burned from the spent catalyst decreases with an increase in the density of the cracking catalyst. The activity and hardness of the catalyst have also been found to be affected by its density, the hardness of the catalyst increasing with an increase in density. It is accordingly desirable to adjust the density of the catalyst to an intermediate value between the maximum and minimum limits of density control in order to obtain the most beneficial effects of activity, hardness, and regenerative properties in the resulting catalyst.

Control over the density of gel catalysts can be effected by subjecting the hydrogel to a hot water treatment which comprises contacting the freshly formed hydrogel with hot water for a specified period of time. The duration of the contact time and the temperature of the water used will determine the apparent density of the treated gel within limits of from about 0.5 to about 0.9 gram per cubic centimeter. The desired density of the final catalyst will depend on the coke burning capacity of the regenerating kiln employed, the particular degree of hardness desired in the catalyst, and the activity of the resulting catalyst. Taking these factors into consideration, generally a catalyst having an apparent density of between about 0.60 and about 0.76 gram per cc. will be employed. The use of either longer soaking time or higher temperature or both decreases the catalyst density. For example, soaking a freshly formed silica-alumina hydrogel in treating water for 8.5 hours at 125° F., for 2.5 hours at 150° F. or for 5 minutes at 212° F. results in finished catalysts of the same density. Thus adjustment of density in the catalyst should preferably be made before the removal of sodium is undertaken in the manner described below.

The reduction of sodium content in the catalyst is brought about by base exchanging an inorganic oxide hydrogel which has preferably been subjected to hot water treatment as described above with a polyvalent metal salt capable of displacing a large part of the zeolitic sodium, then base exchanging remaining zeolitic sodium with an ammonium salt solution, finally water washing and drying at an elevated temperature. The sodium content of the resulting product is of the order of .05 per cent by weight or less as compared with sodium contents of 0.2 per cent and higher obtained when treatment with the ammonium salt is omitted. This difference in sodium content is of definite advantage in decreasing the rate of deactivation of the catalyst as will be shown in the following examples.

EXAMPLE 1

A silica-alumina hydrosol was prepared by mixing 1.00 volume of a solution of sodium silicate containing 157.00 grams SiO$_2$ per liter with 1.00 volume of a solution containing 39.79 grams of aluminum sulfate and 30.51 grams of sulfuric acid per liter. The resulting colloidal solution was ejected from a nozzle in the form of globules into a column of gas oil whose depth was about eight feet. The globules of solution fell through the oil and gelled before passing into a layer of water located beneath the oil. The time of gelation for the concentration and proportions of reactants given above was about 4 seconds. The spherical particles of hydrogel were sluiced out of the bottom of the column into a tank of water maintained at a temperature of about 115° F. They remained there for a period of 8.5 hours and on removal from the hot water were base exchanged with an aqueous solution containing 3 equivalent weights of aluminum sulfate for a period of 18 hours. The equivalent weight was based on the stoichiometric quantity of aluminum sulfate required to displace the amount of zeolitic sodium contained in the freshly formed hydrogel, which amount is of the order of 4% by weight of the finished gel. This figure was ascertained by previous analysis and has been used in determining the equivalent weight of base-exchanging compounds to be used throughout the present work.

After base exchanging with aluminum sulfate, the hydrogel particles were treated with an aqueous solution containing 1.5 equivalent weights of ammonium sulfate for a period of 12 hours. At the end of this time the hydrogel particles were removed and washed with water for 6 hours, removing any soluble salts present. The hydrogel was then slowly and uniformly dried in superheated steam at about 300° F. until shrinkage of the gel was substantially complete. The drying was continued at a gradually increasing temperature up to 1400° F. at which temperature it was maintained for ten hours. The small amount of ammonium ion contained in the hydrogel as a result of the base exchange with the ammonium salt was decomposed in the drying and tempering operation so that the finished catalyst was of high purity and quality. The sodium content of the gel catalyst was .03% by weight.

A second sample of hydrogel particles, hot water treated and base exchanged with aluminum sulfate exactly as described above were water washed for 18 hours after the treatment with aluminum sulfate. They were then dried in the manner disclosed above, the base exchange with ammonium sulfate being omitted. The sodium content of the resulting gel was 0.19% by weight.

These two catalysts were employed in cracking light East Texas gas oil having an A. P. I. gravity of 36.0° and a boiling range of 418 to 714° F. to gasoline having an end point of 410° F. by passing vapors of said gas oil through the catalyst at 800° F. substantially atmospheric pressure, and at a feed rate of 1.5 volume of liquid oil per volume of catalyst per hour. The percentage conversion to gasoline under the above conditions is a measure of the activity of the catalyst and is referred to herein as activity index.

The effect of residual sodium content on the activity and rate of deactivation of the two catalysts after periods simulating five months service in a commercial cracking unit are shown below:

| | Initial Catalyst Activity | | Activity After Period Assimilating Five Months Service | |
|---|---|---|---|---|
| Residual Sodium Content | 0.03 | 0.19 | .03 | 0.19 |
| Activity Index | 51.2 | 50.6 | 42.0 | 39.7 |
| Coke, Percent Wt | 4.3 | 4.7 | 2.8 | 2.5 |
| Gas, Percent Wt | 10.7 | 9.1 | 6.8 | 5.7 |
| Gas Gravity (Air=1) | 1.58 | 1.68 | 1.57 | 1.53 |

From the above table it will be seen that the activity index of the lower sodium content catalyst dropped 9.2 activity units as compared with the decrease of 10.9 activity units for the catalyst having a higher sodium content, both catalysts being in simulated commercial operation for the same period of time. This difference in rate of deactivation becomes more pronounced as the sodium content and length of service of the catalyst increases.

The effect of the sodium content of the catalyst on its rate of deactivation can be shown quite readily by preparing a series of catalysts having an increasing sodium content. The amount of sodium in catalysts having more than 0.2% by weight sodium is regulated by the quantity of aluminum sulfate used in the base exchange operation. Smaller amounts of aluminum sulfate used give a higher sodium content in the resulting final catalyst. Gel catalysts prepared as described above were made omitting the ammonium salt treatment and using varying quantities of aluminum sulfate in the base exchange operation to control the amount of residual sodium. The initial catalyst activity data and the data obtained after a period simulating five months service of the catalyst in each case were obtained using light East Texas gas oil of the type described and are tabulated below:

*Initial catalyst activity*

| Residual Sodium Content Per Cent Wt. | Activity Index | Coke, Per Cent Wt. | Gas Per Cent Wt. | Gas Gravity (Air=1) |
|---|---|---|---|---|
| 0.03 | 51.2 | 4.3 | 10.7 | 1.58 |
| 0.19 | 50.6 | 4.7 | 9.1 | 1.68 |
| 0.27 | 51.1 | 4.6 | 10.0 | 1.53 |
| 0.48 | 48.8 | 4.7 | 10.6 | 1.53 |
| 0.67 | 49.6 | 4.6 | 9.0 | 1.64 |
| 0.85 | 47.5 | 4.3 | 8.8 | 1.56 |

*Activity after a period simulating five months service*

| Residual Sodium Content, Per Cent Wt. | Activity Index | Coke, Per Cent Wt. | Gas, Per Cent Wt. | Gas Gravity (Air=1) | Rate of Deactivation (Activity Units Five Months Service) |
|---|---|---|---|---|---|
| 0.03 | 42.0 | 2.8 | 6.8 | 1.57 | 9.2 |
| 0.19 | 39.7 | 2.5 | 5.7 | 1.53 | 10.9 |
| 0.27 | 38.9 | 2.4 | 5.9 | 1.48 | 12.2 |
| 0.48 | 35.8 | 2.3 | 5.2 | 1.51 | 13.0 |
| 0.67 | 32.8 | 2.0 | 4.1 | 1.46 | 16.8 |
| 0.85 | 30.6 | 1.8 | 3.1 | 1.41 | 16.9 |

Having thus established that an extremely low sodium content hydrocarbon conversion catalyst is of definite advantage in decreasing the rate of deactivation of the catalyst upon use over an extended period of time, the following examples will further serve to illustrate the invention.

EXAMPLE 2

A silica-alumina hydrogen prepared and treated with hot water as in Example 1 was base exchanged with an aqueous solution containing 3 equivalent weights of aluminum sulfate for 18 hours at room temperature. At the completion of the initial base exchange the hydrogen particles were removed from the aluminum sulfate solution and further treated with an aqueous solution containing 0.50 equivalent weight of ammonium nitrate for 12 hours and then water washed for 6 hours after removal from the ammonium salt solution. Any water-soluble salts present in the hydrogel were removed by the latter washing, while zeolitic sodium contained in the hydrogel was displaced in the two base exchange operations. The hydrogel thus treated was dried as in Example 1 and the gel upon analysis was found to contain 0.05 percent by weight of sodium. This figure is to be compared with a value of 0.19 percent by weight sodium for similar gels in which base-exchange treatment with an ammonium salt was omitted.

The resulting low sodium content gel had a bulk density of 0.76 gram per cubic centimeter which was controlled by hot water treatment prior to the base exchange operation. Since a cracking catalyst should preferably be a hard porous mass, the gel was also subjected to a strength test which comprised subjecting each particle to a crushing weight of 40 pounds. The percentage of the above gel particles which passed the strength test was 87%.

Further examples in which a hydrogel was prepared and hot water treated as in Example 1 and exchanged with various salts to give a low sodium content catalyst are summarized in the table below:

| Example | Initial Base Exchange Salt | | | Secondary Base Exchange Salt | | | Water Wash Time, Hours | Residual Sodium Content, Per cent Wt. | Passing Strength Test, Per cent Wt. | Bulk Density g./c. c. |
|---|---|---|---|---|---|---|---|---|---|---|
| | Name | Equivalent Weights | Contact Time, Hours | Name | Equivalent Weights | Contact Time, Hours | | | | |
| 3 | Magnesium Sulfate | 3.0 | 18 | None | None | None | 18 | 0.50 | | 0.65 |
| 4 | do | 3.0 | 18 | Ammonium Sulfate | 1.00 | 12 | 6 | 0.11 | | 0.62 |
| 5 | Nickel Nitrate | 3.0 | 18 | None | None | None | 18 | 0.36 | | 0.85 |
| 6 | do | 3.0 | 18 | Ammonium Sulfate | 1.00 | 12 | 6 | 0.09 | | 0.76 |
| 7 | Aluminum Sulfate | 3.0 | 18 | do | 0.25 | 12 | 6 | 0.12 | | 0.74 |
| 8 | do | 3.0 | 18 | do | 0.50 | 12 | 6 | 0.05 | 89 | 0.76 |
| 9 | do | 3.0 | 18 | do | 1.00 | 12 | 6 | 0.05 | 87 | 0.74 |
| 10 | Ammonium Sulfate | 3.0 | 18 | None | None | None | 18 | 0.27 | 10 | 0.73 |
| 11 | Aluminum Sulfate | 3.0 | 18 | Ammonium Chloride | 0.50 | 12 | 6 | 0.05 | 90 | 0.75 |
| 12 | Ammonium Sulfate | 3.0 | 18 | Aluminum Sulfate | 0.50 | 12 | 6 | 0.11 | 86 | 0.76 |
| 13 | Aluminum Sulfate | 3.0 | 18 | Sulfuric Acid | 1.00 | 12 | 6 | 0.12 | 32 | 0.78 |
| 14 | Aluminum Sulfate and Ammonium Sulfate | 3.0 / 1.0 | 18 | None | None | None | 18 | 0.08 | 86 | 0.75 |
| 15 | do | 3.0 / 2.0 | 18 | do | None | None | 18 | 0.06 | 97 | 0.76 |
| 16 | do | 3.0 / 3.0 | 18 | do | None | None | 18 | 0.05 | 93 | 0.76 |

From the above table it will be seen that in addition to aluminum sulfate, other polyvalent metal salts such as those of magnesium and nickel may be employed as initial base exchange solutions. The secondary base exchange solutions may include any ionizable ammonium salt. Ammonium salts of the mineral acids being most common and particularly ammonium sulfate will however generally be used. Other compounds used as secondary base exchange materials such as sulfuric acid in Example 15 resulted in an excessive breakage of the gel particles.

Examples 7–9 illustrate the effect on the sodium content of the final catalyst by increasing the concentration of ammonium sulfate secondary base exchange solution. Generally an equivalent weight of 0.50 or greater of ammonium salt is necessary to obtain the desirable low sodium content in the final catalyst. An equivalent weight of 3.0 of initial base exchange solution has been used throughout the examples since greater amounts while doing no harm had little effect on the physical properties of the resulting final catalyst. Smaller amounts than 3.0 equivalent weights however gave a catalyst having an increased sodium content.

In Example 10, the hydrogel particles were base exchanged initially with ammonium sulfate solution for purposes of comparison. The physical properties of the resulting catalyst show a relatively high sodium content and an excessive breakage of the gel particles, indicating that the two component base exchange process of the present invention is essential if an extremely low sodium content catalyst is to be obtained.

In Example 12, the initial base exchange was carried out with an ammonium sulfate solution, followed by base exchange with aluminum sulfate solution being the reverse of the process previously employed. While the sodium content of the resulting gel catalyst was an improvement over that employing either of the salts alone, it was still over twice as great as when the hydrogel was base exchanged initially with aluminum sulfate followed by secondary base exchange with ammonium sulfate as in Example 8. Thus, the latter sequence of base exchanging is to be preferred.

An alternative method of reducing the sodium content of the gel catalyst is shown in Examples 14–16. There the hydrogel is treated with a mixture of aluminum sulfate and ammonium sulfate present in the ratios indicated. The results show that while a low sodium content gel can be obtained using this method of base exchange, larger quantities of ammonium salt are consumed in obtaining the desired low sodium content as compared with the method in which the hydrogel is first treated with a polyvalent metal salt solution, followed by base exchanging with an ammonium salt solution.

While the above examples have illustrated the removal of sodium from silica alumina hydrogels, other inorganic oxide hydrogels may likewise be treated to yield an improved low sodium content catalyst of controlled density. Thus, ceric oxide-silica, stannic oxide-silica, ceric oxide-stannic oxide-silica and similar gels of low sodium content may be produced.

Thus, the present invention in its most preferable aspects contemplates an extremely low sodium hydrocarbon conversion catalyst prepared by base exchanging an inorganic oxide hydrogel which has been treated with hot water first with a polyvalent metal salt solution containing at least three times the theoretical quantity of polyvalent metal salt required to displace the sodium in the hydrogel and secondly with an ammonium salt solution containing from about 0.50 to about 1.50 times the theoretical quantity of ammonium salt necessary to displace the sodium in the hydrogel, water washing the base exchanged hydrogel and drying at a temperature sufficient to remove ammonium compounds from the final catalyst.

To effectively control the catalyst density the freshly formed hydrogel must be hot water treated before being base exchanged. If these operations are reversed the density cannot be effectively reduced. For example a silica-alumina hydrogel which has been hot water treated for 8.5 hours at 125° F. before base exchanging results in a finished catalyst having an apparent density of about 0.65 gram per cc. whereas, the same composition hydrogel subjected to a similar hot water treatment after base exchanging results in a finished catalyst density of about 0.85 gram per cc. When the hot water treating process is omitted from the silica-alumina hydrogel processing operation the resultant finished catalyst density is about 0.90 gram per cc.

The present invention of course is not to be limited by any theory but it is believed that ammonium salts while not particularly effective in themselves for the removal of zeolitic sodium or other alkali metals from inorganic oxide hydrogels act as excellent scavenging agents for the small amount of zeolitic alkali metal remaining in the hydrogel after most of such metal has been displaced by a base exchange treatment with a polyvalent metal salt solution. In accordance with this theory, the sodium content of hydrogel catalysts is reduced by an initial base exchange process with a polyvalent metal salt and then substantially freed of zeolitic sodium by the scavenging action of an ammonium salt which displaces small amounts of remaining sodium not effectively removed by the initial base exchange operation. The action of the exchange salts is believed to be selective as illustrated by the fact that the sodium content can be reduced by treatment with a mixture of polyvalent metal and ammonium salts.

We claim:

1. A method of making a substantially alkali-free silica-alumina gel type hydrocarbon conversion catalyst, which comprises permitting a hydrosol of silica and alumina containing zeolitic alkali metal to set to a hydrogel, contacting the hydrogel so obtained with hot water for a period sufficient to adjust its density to a predetermined value, soaking the resulting hydrogel in an aqueous polyvalent metal salt solution containing at least three times the theoretical quantity of polyvalent metal salt required to displace the alkali metal in the hydrogel, and thereafter soaking said hydrogel in an aqueous solution of an ammonium salt containing from about 0.5 to about 1.5 times the theoretical quantity of ammonium salt necessary to displace the original alkali metal in the hydrogel, water-washing the treated hydrogel free of soluble matter, and drying at an elevated temperature to yield a silica-alumina gel, whereby the residual quantity of alkali metal in said gel is decreased below the minimum which can be achieved by an equivalent base exchange using polyvalent metal or ammonium salts exclusively.

2. A method of making a substantially alkali-free silica-alumina gel type hydrocarbon conversion catalyst, which comprises permitting a hydrosol of silica and alumina containing zeolitic alkali metal to set to a hydrogel, contacting the hydrogel so obtained with hot water for a period sufficient to adjust its density to a predetermined value, soaking the resulting hydrogel in an aqueous aluminum salt solution containing at least three times the theoretical quantity of aluminum salt required to displace the alkali metal in the hydrogel, and thereafter soaking said hydrogel in an aqueous solution of an ammonium salt containing from about 0.5 to about 1.5 times the theoretical quantity of ammonium salt necessary to displace the original alkali metal in the hydrogel, water-washing the treated hydrogel free of soluble matter, and drying at an elevated temperature to yield a silica-alumina gel, whereby the residual quantity of alkali metal in said gel is decreased below the miniumum which can be achieved by an equivalent base exchange using aluminum or ammonium salts exclusively.

3. A method of making a substantially alkali-free silica-alumina gel type hydrocarbon conversion catalyst, which comprises permitting a hydrosol of silica and alumina containing zeolitic alkali metal to set to a hydrogel, contacting the hydrogel so obtained with hot water for a period sufficient to adjust its density to a predetermined value, soaking the resulting hydrogel in an aqueous magnesium salt solution containing at least three times the theoretical quantity of magnesium salt required to displace the alkali metal in the hydrogel, and thereafter soaking said hydrogel in an aqueous solution of an ammonium salt containing from about 0.5 to about 1.5 times the theoretical quantity of ammonium salt necessary to displace the original alkali metal in the hydrogel, water-washing the treated hydrogel free of soluble matter, and drying at an elevated temperature to yield a silica-alumina gel, whereby the residual quantity of alkali metal in said gel is decreased below the minimum which can be achieved by an equivalent base exchange using magnesium or ammonium salts exclusively.

4. A method of making a substantially alkali-free silica-alumina gel type hydrocarbon conversion catalyst, which comprises permitting a hydrosol of silica and alumina containing zeolitic alkali metal to set to a hydrogel, contacting the hydrogel so obtained with hot water for a period sufficient to adjust its density to a predetermined value, soaking the resulting hydrogel in an aqueous nickel salt solution containing at least three times the theoretical quantity of nickel salt required to displace the alkali metal in the hydrogel, and thereafter soaking said hydrogel in an aqueous solution of an ammonium salt containing from about 0.5 to about 1.5 times the theoretical quantity of ammonium salt necessary to displace the original alkali metal in the hydrogel, water-washing the treated hydrogel free of soluble matter, and drying at an elevated temperature to yield a silica-alumina gel, whereby the residual quality of alkali metal in said gel is decreased below the minimum which can be achieved by an equivalent base exchange using nickel or ammonium salts exclusively.

5. A process for removing alkali material from a hydrogel of silica and alumina containing zeolitic alkali metal, which comprises soaking the hydrogel in an aqueous polyvalent metal salt solution containing at least three times the theoretical quanity of polyvalent metal salt required to displace the alkali metal in the hydrogel, and thereafter soaking said hydrogel in an aqueous solution of an ammonium salt containing from about 0.5 to about 1.5 times the theoretical quantity of ammonium salt necessary to displace the original alkali metal in the hydrogel, water-washing the treated hydrogel free of soluble matter, and drying at an elevated temperature to yield a silica-alumina gel, whereby the residual quantity of alkali metal in said gel is decreased below the minimum which can be achieved by an equivalent base exchange using polyvalent metal or ammonium salts exclusively.

JOHN W. PAYNE.
THOMAS P. SIMPSON.
JAMES I. BUTZNER.

REFERENCES CITED

The following references are of record in the file of this patent:

UNITED STATES PATENTS

| Number | Name | Date |
|---|---|---|
| 1,900,859 | Connolly et al. | Mar. 7, 1933 |
| 1,939,647 | Arnold et al. | Dec. 19, 1933 |
| 2,229,353 | Thomas et al. | Jan. 21, 1941 |
| 2,242,553 | Thomas et al. | May 20, 1941 |
| 2,278,746 | Sturgeon | Apr. 7, 1942 |
| 2,283,173 | Bates | May 19, 1942 |
| 2,285,314 | Thomas et al. | June 2, 1942 |
| 2,356,303 | Connolly | Aug. 22, 1944 |
| 2,364,949 | Connolly | June 12, 1944 |
| 2,384,505 | Thomas et al. | Sept. 11, 1945 |
| 2,406,614 | Lee | Aug. 27, 1946 |
| 2,410,111 | Thomas et al. | Oct. 29, 1946 |

Certificate of Correction

Patent No. 2,453,585. November 9, 1948.

JOHN W. PAYNE ET AL.

It is hereby certified that errors appear in the printed specification of the above numbered patent requiring correction as follows:

Column 1, line 25, and column 6, lines 5 and 11, for the word "hydrogen" read *hydrogel*; column 9, line 12, for "miniumum" read *minimum*; column 10, line 5, for "quality" read *quantity*; line 15, for "quanity" read *quantity*;

and that the said Letters Patent should be read with these corrections therein that the same may conform to the record of the case in the Patent Office.

Signed and sealed this 17th day of May, A. D. 1949.

[SEAL]

THOMAS F. MURPHY,
*Assistant Commissioner of Patents.*